United States Patent [19]

Cole, Jr.

[11] 4,061,790

[45] Dec. 6, 1977

[54] CONTINUOUS DOUBLE COATING-NATURAL CEREAL

[75] Inventor: Keith M. Cole, Jr., Battle Creek, Mich.

[73] Assignee: General Foods Corporation, White Plains, N.Y.

[21] Appl. No.: 632,136

[22] Filed: Nov. 14, 1975

[51] Int. Cl.² .................. A23L 1/164; A23L 1/18
[52] U.S. Cl. .................... 426/303; 426/93; 426/99; 426/103; 426/307
[58] Field of Search ............. 426/303, 307, 309, 96, 426/93, 99, 103, 619, 621, 632

[56] References Cited

U.S. PATENT DOCUMENTS

| 3,840,685 | 10/1974 | Lyall et al. | 426/93 X |
|---|---|---|---|
| 3,868,471 | 2/1975 | Decelles et al. | 426/307 X |
| 3,876,811 | 4/1975 | Bonner et al. | 426/96 X |

*Primary Examiner*—Raymond N. Jones
*Assistant Examiner*—Esther M. Kepplinger
*Attorney, Agent, or Firm*—Bruno P. Struzzi; Michael J. Quillinan; Mitchell D. Bittman

[57] ABSTRACT

In the art of coating an admixture of cereal particles in a granola-type mix, the particles are double coated with fat and then a dilute syrup. In respective enclosed elongagted screw conveyor means having cut-and folded screw flights operative to assure fat absorption and uniform syrup application under moderate conditions whereby only a minor fraction of the syrup moisture initially present is evaporated during coating and agglomeration.

5 Claims, 4 Drawing Figures

CONTINUOUS DOUBLE COATING-NATURAL CEREAL

FIELD OF THE INVENTION

This invention relates to the coating of tactifying thermo-plastic-liquids to comestibles such as ready-to-eat granola breakfast cereals, and apparatus for effecting such applications to achieve improved aggregation of particles in a continuous coating system.

THE PRIOR ART

In the provision of a granola-type ready-to-eat cereal mix which may comprise fruit or fruit pieces, nut meats and cerel or high protein components of varying shape and density, it becomes desirable to have an agglomerated state which offers crispness when the product is wetted in milk and consumed. Such mixes characteristically have particles of widely varying size and shape and are prone to segregation; agglomeration minimizes such segregation. Coating such components by means of an edible oil and a tackifying adhesive sweetening syrup aids in this agglomeration and offers a pleasant organoleptic quality. Double coating such an admixture, that is, first coating the food with an oil and thereafter with the sweetening syrup, i.e., sucrose with or without a minor quantity of reducing sacharides, offers a particularly functional agglomerate. The oleaginous undercoat softens the particle and thus enhances the individual masticability thereof. The sugar coating assures a degree of crispness, provided it is applied evenly, since otherwise the product may become undesirably tough or excessively chewy, a property of granola-type mixes generally. In this regard it also becomes desirable to include as part of the cereal components a declidedly crisp, low density, aggregating component such as a puffed rice flake which is both adhesive when wetted and thereby serves to adhere finer particles of nut meats and the like and promotes uniform distribution of the varying particles in each aggregate and ultimate agglomerate; to assure such functionality it becomes desirable that such a matrix-forming cereal component not undergo an excessive amount of breakage so that it assures the functionality of offering a relatively lowered bulk density cereal admixture.

Compounding all of the foregoing product requisites is a need to provide continuous application of the coating medium for such a double coating treatment. With continued operation the walls of a coating vessel are prone to collect not only caramelized portions of the coating syrup, but also adhering fine particles of, say, nut meats or other not readily aggregated mixed components; as a result there is a product build-up which has a tendency to induce further separation of finer materials and interfere with mixing efficiency; once build-up occurs the material is inclined to break off the coating vessel walls and mix in with the agglomerates giving a non-uniform eating quality. In addition, with the continued heat treatment there is a caramelization which detracts from product stability and acceptability and eventually necessitates frequent shut-down of the coating operation and the entire cereal production.

OBJECTS OF THE INVENTION

The objects of the present invention are to rectify the foregoing limitations of prior art processes in a coating system which has minimal clogging of solidified coating and fine particles while assuring the intended uniform characteristic granola agglomeration through double-coating both an oleaginous protective coating and a uniform and substantially complete controllable second sweetening-coating application.

SUMMARY OF THE INVENTION

The present invention is predicated upon the employment of separately functioning, preferably upwardly-inclined enclosed screw conveyor means having a high length to radius (L/R) ratio wherein an admixture of comestible particles of substantially differing size, shape and density are first contacted by an oleaginous coating in a first zone and thereafter by a relatively dilute sweetening syrup in a second zone which perfects the production of an agglomerate by removing only a minor fraction of moisture present in the coating syrup. Application of the double coating in each zone is characterized by the following functional properties:

a. a high length to radius ratio effective to provide substantial dwell time in the conveyor and permit respective coatings to be either absorbed, in the case of the oleaginous initial coating in the first zone, or to be uniformly and thinly coated on the previously oil-coated particles as in the sweetening syrup applied in the second zone, said latter coating occuring with evaoration of only a minor fraction of the syrup moisture present and insubstantial temperature elevation or variation;

b. a cut-and folded screw flight means for each conveyor whereby said flights are effective to promote maximal coating action in respective conveyor chambers;

c. a screw flight and shaft radius that is sufficiently large in relationship to the conveyor radius in each zone to promote maximal coating;

d. synchronous metering means to charge the admixture to the first zone at a sufficient rate in relation to that of the chamber space in respective conveyors to assure that the materials undergoing coating occupy a majority of said chamber space throughout respective conveyor lengths; and e. conveyor chamber means which are substantially immediately circumjacent the free edges of the conveyor screw flights to assure a positive displacement of material as it advances and is coated in respective first and second zones, and to assure positive "wiping" of the circumjacent conveyor chamber walls by the charge material intermediate free edges of the screw flights and the conveyor cylinder walls, recognizing that there is a minimal free space between the flights and the chamber.

The use of a cut-and folded flighted screw conveyor, preferably inclined but alternatively level accomplishes continuous blending and transfer of the dry dissimilar particles and assures continuous blending of oil and syrup and continuous reworking of the blended materials to produce aggregations of the coated particles. The functioning of the apparatus and process affords even distribution of the dissimilar particles, even distribution of the oleaginous material and syrup onto the particles, uniform aggregation of the coated particles as a heterogenous mixture and substantial particle-to-particle contact during coating and mixing. Advantageously, coating, mixing and aggregation of particles is achieved with minimal loss of material due to build-up on the sides of the conveyor chamber walls; also, there is a control of finished product total sugars and total fat level within predetermined tolerance requirements by providing a positive constant flow of material; in addition, there is provided a self-cleaning coating process which avoids interruption of the coating and aggregating cycle and the entire manufacturing stream. Thus, dry dissimilarly sized and shaped particles of varying densities can be blended along with oleaginous material and syrup without separation and the aforesaid build-up and the problems associated therewith.

THe foregoing coating operation will vary depending upon the number of cuts for a 360° screw conveyor arc, the total number of flights, RPM of the flights in respective conveyor chambers, inclination of the conveyors, the lengths respectively thereof and the nature of the material undergoing coating in the two separate zones. In addition, the quantity of finer sized particles in relationship to the larger ones can influence the chamber coating and agglomerating properties. Nevertheless, it will characteristically occur that after preblending and initial application of oleaginous material the varying sized particles will achieve a partial aggregation of finer particles onto larger ones once there has been an initial application of liquid coating fat or oil; throughout this initial coating operation the positive intimate tumbling afforded by the conveyor means to be described in detail hereinafter will, nevertheless, assure that the fat coated particles occupy a majority of the chamber areas in the first coating zone, the period of mixing being sufficient to assure fat-absorption to the extent desired. In like manner, in the second syrup coating zone where complete aggregation and agglomeration is effective, although there will be a still further reduction in the amount of chamber volume occupied by the material undergoing treatment with continuing advancement of the particles along the conveyor length, the agglomerates, nevertheless, will occupy a major volume of the chamber area, at least for a major length of the conveying apparatus in said second zone and prior to discharge to a finishing drying operation; this latter second coating assures the provision of a thin, even and maximally distributed syrup and controlled build-up of agglomerates.

Another preferred and advantageous characteristic of the coating process of this invention is that it is preferably conducted without substantial application of heat to the exterior of the coating zone so that the two respective coating materials are distributed over the varying particles of the mix at typically ambient temperatures within the conveyor chamber or, in any event, at a temperature that is controllable and not excessive whereby one may afford intended absorption of fat and concentration of coating syrup without a substantial alteration in the flavor of the material undergoing agglomeration. It will be recognized that both coating materials will be hot and liquid as applied in order that they may respectively remain liquid to promote absorption in the case of the fat, and surface coating and tackifying action in the case of the syrup. Furthermore, applied syrup may undergo some minimal evaporation as a result of the intimate coating that progresses to affect agglomeration in the second zone, but there will not be such moisture reduction or product temperature elevation as occasions caramelization or loss of a major amount of the moisture present in the syrup coating; thus, most of the water that is applied to the agglomerates as a result of treatment in the second coating operation will be removed in a subsequent after drying, whereby there will be less build-up of unwanted fine particles and sacharides on conveyor walls. On the other hand, it is not intended to foreclose use of some extraneous heat for conduction to the interior of respective coating zones, since for some applications it may be desirable to promote further absorption of fat or in the case of a high melt point fat to keep it liquid. Moreover, with variations in plant humidities and temperaturs it may be desired to operate at a higher ambient condition to assure better season-to-season control stemming from variations in given mix blending properties. Nevertheless, the coating chamber will be essentially enclosed to assure a substantially controllable ambient processing temperature, whether it be room temperature or above. Importantly, the system of this invention affords a versatility of operation by controlling the respective coating operations and permitting compensations for variations in the character of the material that is undergoing agglomeration. Thus, mixed materials that are hygroscopic such as dry non-fat milk solids and which may vary in their blending properties depending upon humidity, will be more controllably agglomerated by assuring uniform fat coating and syrup coating. In this connection a relatively dilute syrup having a Brix of less than 80° may be employed and preferably using a significantly dilute character having a Brix below 72°, but above 60° will be used to effect an essentially uniform application of sacharides; however, the invention is not to be restricted to employment of a dilute syrup since a concentrated one of higher degree Brix may be employed to like advantage.

THE DRAWINGS

The invention will be more fully understood by reference to the accompanying drawings wherein FIG. 1 is a side elevation of the coating apparatus embodying the invention with parts broken away to further show details of the coating means;

FIGS. 2 and 3 are enlarged vertical sectionals of the interiors of the coating chamber showing the coating means in elevation and with parts thereof in section; and FIG. 4 is a transverse sectional view of the screw flighting.

DETAILED DESCRIPTION OF THE INVENTION

Figure 1:
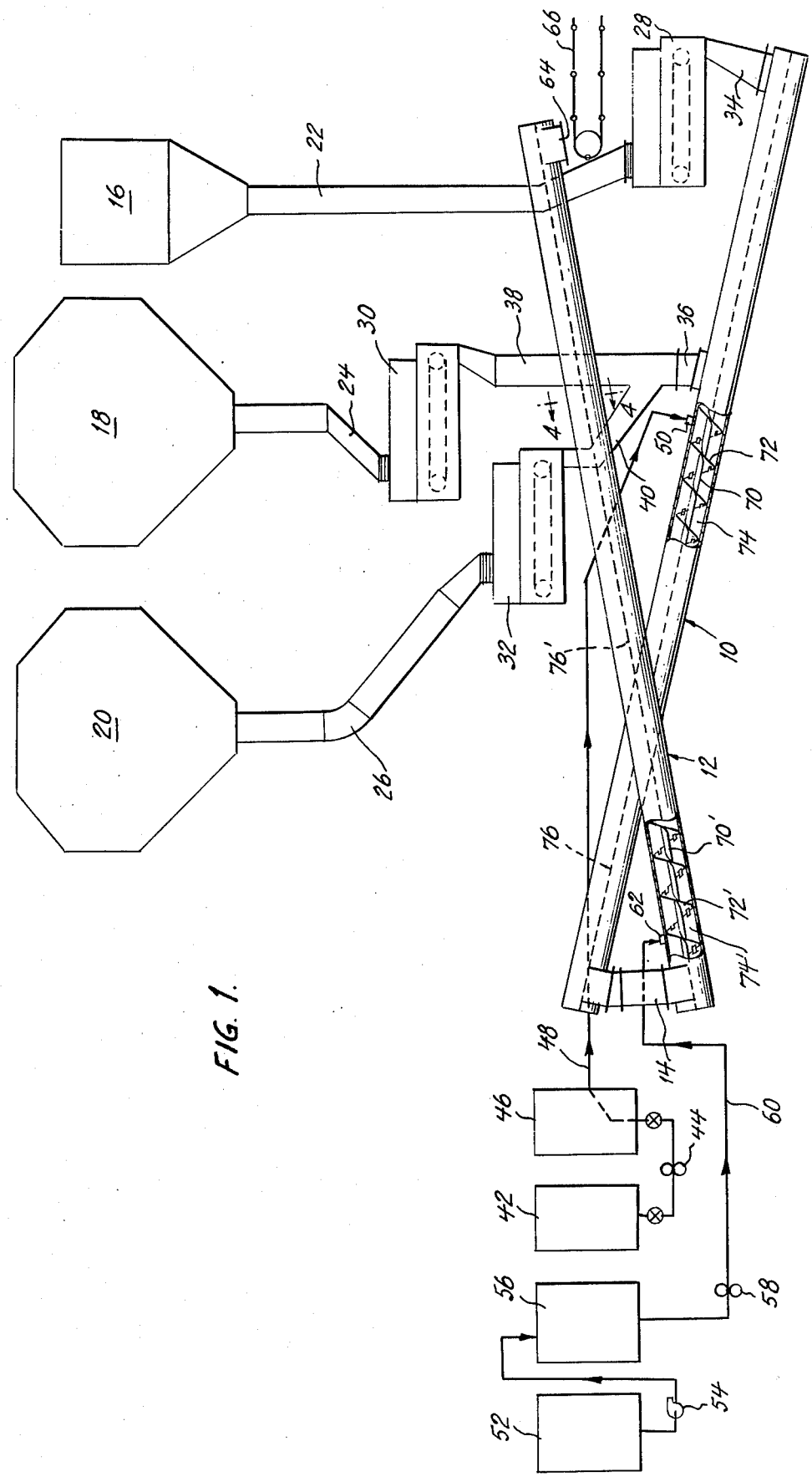
Figure 2:
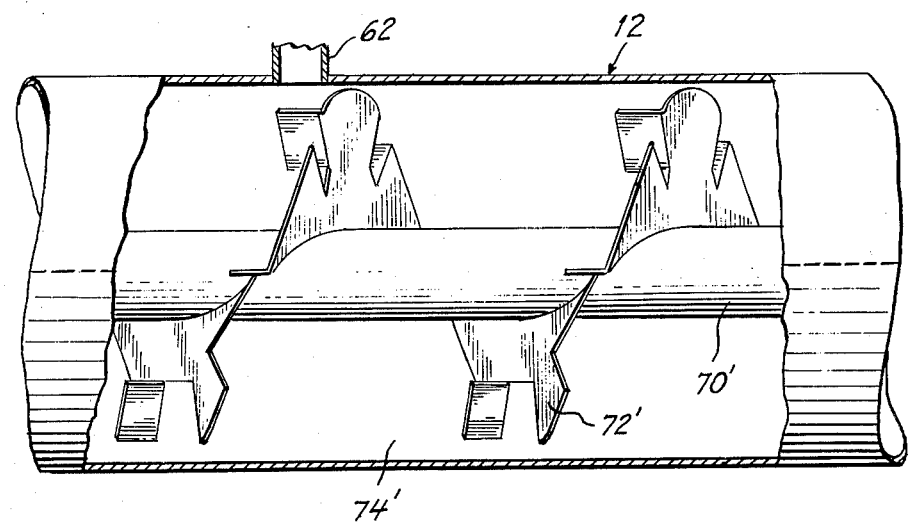
Figure 3:
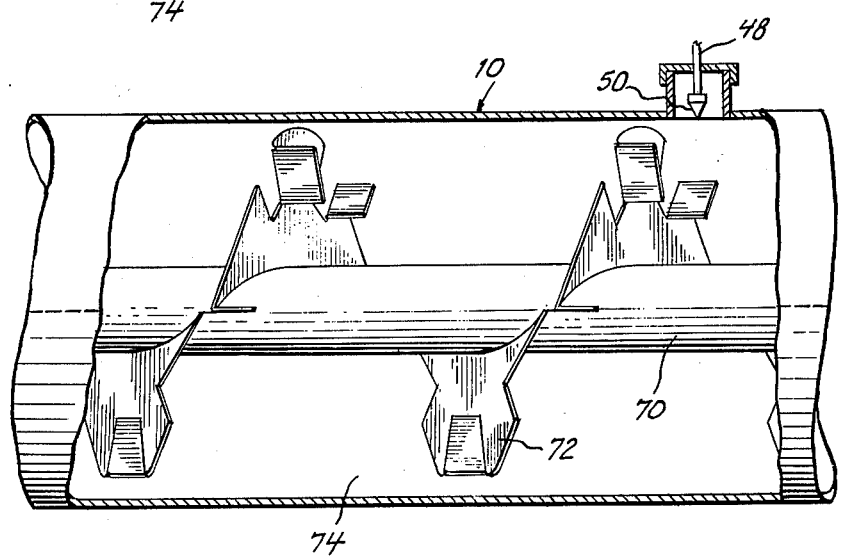

In the Figures, the preferred blending and coating system will be seen to comprise two screw conveyors generally shown as 10, and 12 communicating with one another through a spout 14. Bins 16, 18 and 20 respectively feed fine particles, puffed rice flakes, and bumped wheat flakes through spouting tubes 22, 24 and 26 and metering scales 28, 30 and 32 admit respective charges to the first screw conveyor 10 at spouts 34 and 36, the cereal components from bins 18 and 20 being blended as they merge in spout 36 through communicating ducts 38 and 40. Details of spout metering and delivering systems will be well understood by those skilled in the art and are only schematically illustrated herein and form no part of the invention.

A fat spray delivery system in holding tank 42 is delivered through a positive displacement pump 44 to pressure tank 46. Oil at a constant temperature is forced out of tank 46 through line 48 to spray head 50 which provides a fan-type spray onto the dry blended ingredients in the conveyor chamber to be described hereinafter.

A syrup metering system comprises syrup mix tank 52 delivered by pump 54 to hot syrup holding tank 56 which feeds hot syrup under positive displacement pump 58 through line 60 to syrup applicator head 62 in second conveyor 12.

Material aggregated in second conveyor 12 and eventually agglomerated therein is discharged from the upper end thereof through spout 64 onto a dryer apron 66 shown in phantom; the dryer receives agglomerate and completes dehydration thereof to a stable moisture content that is desirably below 5% and at that moisture level whereat the agglomerate is crisp.

As seen in FIG. 1, both cut and folded screws are substantially of the same pitch and high L/R ratio, flights being cut and folded at 5 segments per 360° arc rotation. In general, each conveyor will comprise a conveyor shaft 70 having screw flights 72 adapted to rotate within essentially complementary circumjacent conveyor housing 74 which may be fabricated with a drop-bottom for easy cleaning as signified by the broken line 76. Like reference numerals (primed) are employed for the second coating conveyor 12.

Figure 4:
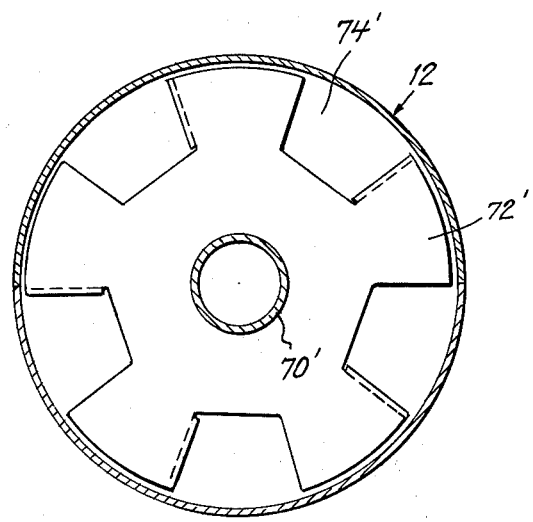

Generally speaking, each screw conveyor will have a sufficiently elongated geometry as expressed in terms of an L/R ratio (conveyor length/screw flight radius ratio) to assure effective intimate blending and particle-to-particle contact during both coating operations. No critical or specific L/R ratio need be specified inasmuch as the rotational rate of the screw and the inclination thereof are factors that infuence the dwell time of charge material in each conveyor zone. Broadly, an L/R ratio in excess of 10 to 1 and more commonly in excess of 15 to 1 typically as shown in FIG. 1. may be employed. The number of cuts and folds in like manner may vary, there being a sufficient plurality thereof as shown to effect the characteristic tumbling and reblending of materials both before and after spray application, all of which is within the ambit of experimentation, a typical cut and folded segment being as shown in FIG. 4.

In operation fine particles of a premix blend comprising about 6 parts dry nonfat milk solids, about 4 parts sliced almonds, about 4 parts sliced coconut shreds, about 55 parts rolled oats and optionally vitamins or minerals are delivered through metering scale 28 and spout 34 into first screw conveyor 10, shafts 70 rotating at 26 RPM, shaft fights having a 9 inch nominal diameter at the lateral free edges thereof. About 24 parts oven toasted and puffed rice flakes are similarly delivered for blending with about 9 parts bumped wheat and spouted through spout 36 into first conveyor 10 downstream from the first dry blend. With continued advancement of the blended ingredients they are contacted by a spray of coconut oil at 110° F. and delivered at a rate of 209 lbs. per hour at spray head 50, the dry blend being delivered at a rate of 654 lbs. per hour from bin 16 and the rice at a rate of 226 lbs. per hour from bin 18 and the wheat at 86 lbs. per hour from bin 20. With continued agitation the material flows upwardly under the positive displacement of the flights and is discharged to spout 14 into second screw conveyor 12 operating to receive the fat-coated partially aggregated material.

Screw 70' in second conveyor 12 operates at 15 RPM and delivers charge to the syrup spray head 62. Syrup is applied at a rate of 514 lbs. per hour (69° Brix); the syrup comprises 6.0% corn syrup (42 DE), 6.0% brown sugar, 3.6% honey and vitamins, and the remainder water. With continued rotation material is delivered upwardly along the incline as shown in FIG. 1. and discharges onto the apron of dryer 66 as a uniform heterogenous agglomerate of the dry particles uniformly coated with sugar syrup solids, the agglomerate having a moisture content of about 14% entering the drier and 2.5% leaving it. The product has a bulk density of approximately 25.4 lbs. per cubic foot (untapped). The system has been operated 8 days consistently without interruption or clean-up.

The invention will now be more fully understood for its scope by reference to the accompanying claims.

I claim:

1. In a continuous process of coating an admixture of combined comestible particles of substantially differing size, shape and density and wherein particles are first contacted by an oleoagineous coating spray in a first zone and thereafter by a dilute sweet syrup in a second zone to overcoat the fat-coated particles issuing from the first zone and effect agglomeration thereof, the improvement which comprises continuously effecting the coating in each said zone in an enclosed screw conveyor means having a length to radius (L/R) ratio of at least 10 to 1, said conveyor having cut and folded screws flights therewithin with the number of cuts and folds being sufficient in number to effect tumbling and reblending of materials both before and after spray application, and said admixture being charged at a rate sufficient in relationship to the rotational rate of said screw within the chamber space in respective conveyors to assure that materials undergoing coating occupy a majority of the chamber space intermediate the conveyor wall and the screw shaft, said conveyor screw flights being proximate and circumjacent the conveyor chamber walls, only a minor fraction of the syrup moisture evaporating during coating in said second zone.

2. The process of claim 1 wherein the admixture comprises materials selected from the class of cereals, nutmeats and fruit pieces of varying shape and density.

3. The process of claim 2 wherein the cereal component contains an oven-toasted and puffed rice cereal flake.

4. The process of claim 2 wherein the respective screw conveyor means are upwardly inclined in relationship to the advance therein of said admixture.

5. The process of claim 4 wherein the L/R ratio is in excess of 15 to 1.

* * * * *